(12) United States Patent
Haas et al.

(10) Patent No.: US 11,089,610 B2
(45) Date of Patent: Aug. 10, 2021

(54) METHOD AND DEVICE TO PROVIDE A COEXISTENCE MECHANISM FOR TWO DIFFERENT WIRELESS COMMUNICATION TECHNOLOGIES ON A SHARED FREQUENCY RANGE

(71) Applicant: Robert Bosch GmbH, Stuttgart (DE)

(72) Inventors: Christine Haas, Ludwigsburg (DE); Christoph Thein, Hildesheim (DE); Frank Hofmann, Hildesheim (DE); Jean-Philippe Kermoal, Munich (DE); Kurt Eckert, Ditzingen (DE); Monique Duengen, Hannover (DE); Nadia Brahmi, Hildesheim (DE); Peter Svejkovsky, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 16/631,671

(22) PCT Filed: Jun. 11, 2018

(86) PCT No.: PCT/EP2018/065274
§ 371 (c)(1),
(2) Date: Jan. 16, 2020

(87) PCT Pub. No.: WO2019/015868
PCT Pub. Date: Jan. 24, 2019

(65) Prior Publication Data
US 2020/0178269 A1    Jun. 4, 2020

(30) Foreign Application Priority Data

Jul. 18, 2017  (DE) .......................... 102017212242.0
Oct. 13, 2017  (DE) .......................... 102017218317.9

(51) Int. Cl.
*H04W 16/14*     (2009.01)
*H04W 72/12*     (2009.01)
(Continued)

(52) U.S. Cl.
CPC ......... *H04W 72/1231* (2013.01); *H04W 4/40* (2018.02); *H04W 16/14* (2013.01);
(Continued)

(58) Field of Classification Search
CPC ... H04W 72/1231; H04W 4/40; H04W 16/14; H04W 72/1284; H04W 72/14;
(Continued)

(56) References Cited

U.S. PATENT DOCUMENTS

2016/0338094 A1*  11/2016  Faurie ................... H04W 72/14
2017/0188391 A1*  6/2017  Rajagopal ......... H04W 74/0816
(Continued)

OTHER PUBLICATIONS

International Search Report dated Oct. 5, 2018 of the corresponding International Application PCT/EP2018/065274 filed Jun. 11, 2018.
(Continued)

*Primary Examiner* — Mewale A Ambaye
(74) *Attorney, Agent, or Firm* — Norton Rose Fulbright US LLP; Gerard Messina

(57) ABSTRACT

A method for operating a network infrastructure-side network unit of a cell-based wireless communication network includes: predicting a piece of cell-related occupancy information of sidelink resources of a sidelink channel in an unlicensed frequency range; receiving a scheduling request message from a roadside network unit for the sidelink channel on an uplink channel; ascertaining a scheduling grant message for the roadside network unit based on the predicted cell-related occupancy information, the scheduling grant message including an assignment of at least one sidelink resource of the sidelink channel to the roadside
(Continued)

network unit; and sending the scheduling grant information to the roadside network unit on a downlink channel.

7 Claims, 8 Drawing Sheets

(51) Int. Cl.
  *H04W 4/40* (2018.01)
  *H04W 72/14* (2009.01)
  *H04W 84/18* (2009.01)
  *H04W 92/18* (2009.01)
(52) U.S. Cl.
  CPC ....... *H04W 72/1284* (2013.01); *H04W 72/14* (2013.01); *H04W 84/18* (2013.01); *H04W 92/18* (2013.01)
(58) Field of Classification Search
  CPC . H04W 84/18; H04W 92/18; H04W 72/1252; H04W 72/1257; H04W 72/12; H04W 4/42; H04W 4/44; H04W 4/46; H04W 4/48; H04W 16/00; H04W 72/1289; H04W 28/12; H04W 84/05; H04W 29/08306; H04W 29/08567
  See application file for complete search history.

(56) References Cited

U.S. PATENT DOCUMENTS

| | | | |
|---|---|---|---|
| 2018/0035448 A1* | 2/2018 | Gupta | H04W 72/0446 |
| 2018/0049220 A1* | 2/2018 | Patil | H04W 72/1247 |
| 2018/0049235 A1* | 2/2018 | Baghel | H04W 76/14 |
| 2018/0077518 A1* | 3/2018 | Nguyen | H04W 84/00 |

OTHER PUBLICATIONS

Intel Corporation: "LTE-V2V coexistence with DSRC technology" vol. RAN WG1, No. Reno. USA; Nov. 14, 2016-Nov. 18, 2016, Nov. 6, 2016, 3GPP Draft; R1-1611924 Intel—V2V DSRC, 3rd Generation Partnership Project (3GPPP), Mobile Competence Centre, 650, Route Des Lucioles: F-06921 Sophia-Antipolis Cedex, France.

* cited by examiner

METHOD AND DEVICE TO PROVIDE A COEXISTENCE MECHANISM FOR TWO DIFFERENT WIRELESS COMMUNICATION TECHNOLOGIES ON A SHARED FREQUENCY RANGE

CROSS-REFERENCE TO RELATED APPLICATIONS

The present application is the national stage of International Pat. App. No. PCT/EP2018/065274 filed Jun. 11, 2018, and claims priority under 35 U.S.C. § 119 to DE 10 2017 212 242.0, filed in the Federal Republic of Germany on Jul. 18, 2017 and to DE 10 2017 218 317.9, filed in the Federal Republic of Germany on Oct. 13, 2017, the content of each of which are incorporated herein by reference in their entireties.

FIELD OF THE INVENTION

The present invention relates to a method for operating a network infrastructure-side network unit, a network infrastructure-side network unit, a method for operating a roadside network unit, and a roadside network unit.

BACKGROUND

Present vehicles are able to exchange information with other vehicles in their vicinity (V2V: vehicle-to-vehicle). In addition, vehicles can communicate wirelessly with a roadside infrastructure (V2I: vehicle-to-infrastructure). The vehicle can also communicate wirelessly with a backend server on the Internet (V2N: vehicle-to-network) or with a pedestrian terminal (V2P: vehicle-to-person). This communication is also referred to overall as "vehicle-to-everything" (V2X).

The development of new functions and services in the automotive industry, for example automated driving, benefits from V2X. Traffic safety, driving comfort, and energy efficiency can be improved. This results in new products and business models for automotive manufacturers, automotive suppliers, and other service providers.

The first generation of V2X applications, to be used in the years ahead, is based primarily on use on the road. Their purpose is to provide the driver with information about the road surroundings. Vehicles periodically provide status information (for example, position, speed, acceleration, etc.) and/or event information (rescue operations, a broken-down vehicle, traffic jams). This information is generally transmitted locally in the form of text messages. This event-based information can be sent to a central network unit (base station, backend) by neighboring vehicles.

For V2X direct device-to-device (D2D) communication, there are presently two competing technologies. The first technology is based on the radio-based IEEE 802.11p standard, which forms the basis for the comprehensive Dedicated Short Range Communication (DSRC) standard in the United States and the European Telecommunications Standards Institute (ETSI) Intelligent Transport Systems (ITS) G5 standard in Europe. The second technology is based on 3rd Generation Partnership Project (3GPP) Long Term Evolution (LTE), also known by the abbreviation LTE-V2X. An enhancement of the LTE-V2X technology is expected with 5G (5th generation mobile networks).

The IEEE 802.11p standard uses the PHY layer of the IEEE 802.11a standard, based on orthogonal frequency division multiplexing (OFDM) with some modifications. The MAC layer is based on enhanced distributed channel access (EDCA), which is competition-based. In addition, carrier sense multiple access (CSMA) with collision avoidance (CSMA/CA) is used. CSMA/CA follows the "listen before talk" principle for minimizing collisions on the channel. When a network unit (in the present context, a vehicle) has data to transmit, it carries out a channel measurement to check whether the channel is occupied. If the channel is detected as empty, the network unit waits with the planned transmission for a randomly ascertained time, and then begins with the transmission. If the channel is occupied during the channel measurement, the network unit will carry out a backoff procedure; i.e., it awaits the next channel access for a randomly ascertained time period. The greater the number of network units that transmit in a geographical area, the greater the likelihood that a network unit delays its transmission, resulting in overall greater delays in the network. The IEEE 802.11p standard offers advantages over other WLAN standards, based on IEEE 802.11, with regard to latency and signaling complexity, and is adapted to the V2V application.

The LTE enhancement for V2X beginning with 3GPP Release 14 provides for the use of a licensed and/or unlicensed spectrum for the communication. The V2V communication is based on a direct device-to-device interface (also referred to as a sidelink interface on the physical layer). In contrast to 802.11p, the transmission takes place with cell support, i.e., is carried out by the network in a planned manner. Transmission rights are granted by a scheduler unit situated in the base station, thus avoiding collisions and minimizing interferences. The control by the base station can be carried out only in areas in which the base station signal is available (in coverage). In a case in which no base station signal is available (out of coverage), the communication takes place with predefined parameters via the sidelink.

In the course of the development of communication standards, for example starting from different applications or development activities from different technical fields, various standards can be proposed for the same frequency range. As a result, different wireless communication systems would transmit in the same frequency range, resulting in impaired performances for both technologies.

SUMMARY

Consequently, one could formulate an objective technical object to provide a coexistence mechanism for the two different wireless communication technologies in order to equitably distribute available resources.

According to a first and second aspect, a method for operating a network infrastructure-side network unit and a network infrastructure-side network unit are provided. A piece of cell-related occupancy information of sidelink resources of a sidelink channel in an unlicensed frequency range is predicted, the occupancy information including a likely occupancy of the sidelink resources by non-sidelink communication in the unlicensed frequency range. A scheduling request message for the sidelink channel is received by a roadside network unit on an uplink channel. A scheduling grant message for the roadside network unit is ascertained as a function of the predicted cell-related occupancy information, the scheduling grant message including an assignment of at least one sidelink resource of the sidelink channel to the roadside network unit. The scheduling grant message is sent to the roadside network unit on a downlink channel.

Based on the predicted cell-related occupancy information, potentially occupied sidelink resources are identified that contain potential non-sidelink network traffic that is not centrally scheduled. If the potentially free sidelink resources are scheduled, a likelihood of collision of these scheduled sidelink resources with non-sidelink network traffic on the sidelink channel is reduced. Thus, the cell-based wireless network as well as a second wireless network, which share the unlicensed frequency range, benefit. The data rate and the reliability of both wireless networks are increased.

According to a third and fourth aspect, a method for operating a roadside network unit and a roadside network unit are provided. A measurement of a sidelink channel is carried out. A local piece of occupancy information from the past is ascertained based on the measurement of the sidelink channel. The local occupancy information of the sidelink channel is sent to the network infrastructure-side network unit on the uplink channel.

Due to the ascertainment of the local occupancy information by the roadside network unit, the occupancy of the sidelink channel by other than sidelink-capable network units in a reception range of the roadside network unit, i.e., a location-based area, is advantageously ascertained. The transmitted pieces of local occupancy information offer the advantage that during scheduling by the network infrastructure-side network unit, network traffic from non-sidelink-capable network units, whose transmission power output is not sufficient to be ascertained in the network infrastructure-side network unit, is taken into consideration. This consideration allows finer granularity of the scheduling decisions in order to reduce disadvantageous mutual influences in the cell from two wireless networks operating in the same unlicensed frequency range.

Further features and advantages are set forth in the following description of example embodiments.

DETAILED DESCRIPTION

Figure 1:
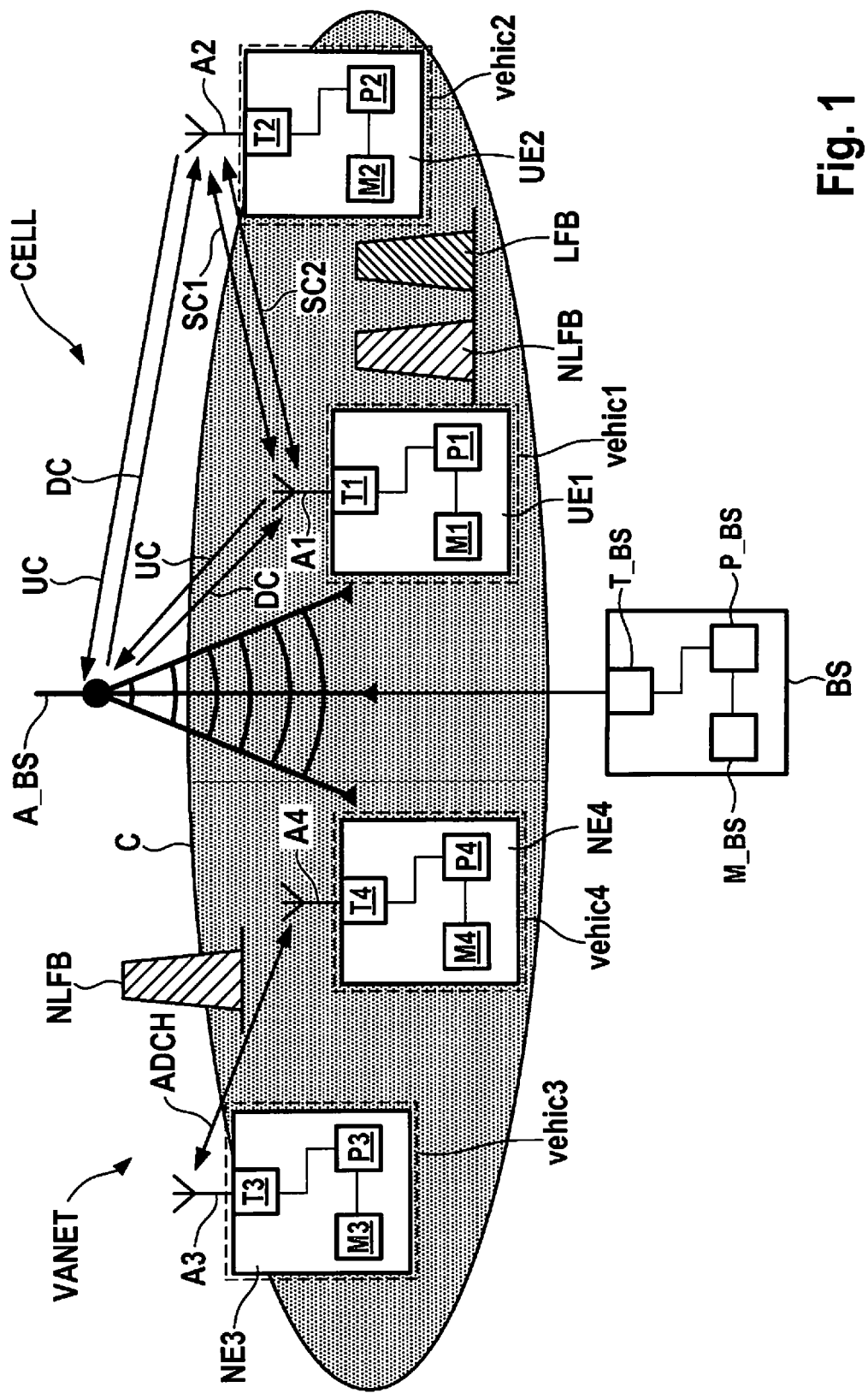
FIG. 1 shows a first cell-based wireless communications network and a second wireless communications network, according to an example embodiment of the present invention.

FIG. 1 shows a first cell-based wireless communications network CELL and a second wireless communications network VANET. First wireless communications network CELL includes a network infrastructure-side network unit BS, a first roadside network unit UE1, and a second roadside network unit UE2. Network infrastructure-side network unit BS includes a processor P_BS, a memory element M_BS, and a transceiver T_BS. Network infrastructure-side network unit BS can also be referred to as a base station or eNodeB. Network infrastructure-side network unit BS is connected to a stationary antenna A_BS in order to transmit data on a downlink channel DC and to receive data on an uplink channel UC. Antenna A_BS includes, for example, a number of antennas and is designed as a remote radio head (RRH), for example. Network infrastructure-side network unit BS and antenna A_BS provide a cell C within which roadside network units UE1 and UE2 communicate with network unit BS. Of course, network infrastructure-side network unit BS can also have a distributed design within the scope of a virtualization, and can be made up of separate network units. Network units BS, UE1, and UE2 are configured according to the LTE-V2X standard, for example.

Roadside network units UE1 and UE2 respectively include a processor P1, P2, a memory element M1, M2, a transceiver T1, T2, and an antenna A1, A2. The two roadside network units UE1, UE2 are situated within cell C, receive data on downlink channel DC, and send data on uplink channel UC. The two roadside network units UE1, UE2 can communicate directly with each other in an unlicensed frequency range NLFB via a first sidelink channel SC1 and in a licensed frequency range LFB via a second sidelink channel SC2.

The two roadside network units UE1, UE2 are situated within cell C and are able to receive data on downlink channel DC and to send data on uplink channel UC. The two roadside network units UE1, UE2 are able to communicate directly with each other in an unlicensed frequency range NLFB via a sidelink channel SC1 and in a licensed frequency range LFB via a sidelink channel SC2. National authorities such as the Federal Network Agency of the Federal Republic of Germany create a frequency usage plan that includes, for example, licenses for a particular network operator. Under the terms of the assigned license, the network operator is allowed to utilize the network infrastructure and terminals in an assigned, i.e., licensed, frequency range or frequency spectrum. In contrast, there are frequency ranges or frequency spectra that are not assigned to a network operator, and that are freely usable under certain criteria such as reduced transmission/reception power output.

In the present application, reference is made to a single uplink channel and a single downlink channel. For example, the uplink channel and the downlink channel each includes subchannels; i.e., multiple channels can be used in the uplink and in the downlink. The same applies for sidelink channels SC1, SC2.

Second wireless communications network VANET includes two further roadside network units NE3 and NE4 that respectively include a processor P3, P4, a memory element M3, M4, a transceiver T3, T4, and an antenna A3, A4. Network units NE3 and NE4 are configured according to the IEEE 802.11p standard, for example. Network units NE3 and NE4 communicate directly with each other in unlicensed frequency range NLFB via an ad hoc channel ADCH. Ad hoc channel ADCH is arbitrated by transceivers T3, T4 via a carrier sense multiple access/collision avoidance (CSMA/CA) protocol.

Computer programs are stored on each of memory elements M1, M2, M3, M4, and, when executed on respective processor P1, P2, P3, P4, they implement the method provided in this description. Alternatively, processors P1, P2, P3, P4 are implemented as ASICs.

Third and fourth network units NE3 and NE4 are situated in the vicinity of the two first and second network units UE1 and UE2, in particular within an area of cell C, so that the particular transmission power output is sufficient to interfere with a transmission of network units UE1 and UE2 in unlicensed frequency range NLFB. As a result, transmissions on channels ADCH and SC1 can mutually adversely affect one another. The objective of the present application is to reduce this mutually adverse effect.

Sidelink channels SC1 and SC2 are operated in a so-called managed mode, which means that network unit BS controls the transmission on sidelink channels SC1 and SC2 via corresponding messages in downlink channel DC. In contrast, ad hoc channel ADCH is not operated in a managed mode. Roadside network units NE3, NE4 thus automatically access ad hoc channel ADCH.

Roadside network units UE1, UE2, NE3, and NE4 are situated in motor vehicles vehic1, vehic2, vehic3, vehic4, respectively, and are connected to a control unit for data exchange, not shown, respectively situated therein. Alternatively, roadside network units UE1, UE2, NE3, and NE4 are part of the control unit in motor vehicle vehic1, vehic2, vehic3, vehic4, respectively. In another alternative example embodiment, roadside network units UE1, UE2, NE3, and NE4 are situated in a stationary infrastructure such as a traffic light instead of in a motor vehicle.

Sidelink channels SC1, SC2 and a sidelink are generally defined, for example, by the document "3GPP TS 36.300 V14.2.0 (2017-03)," which is incorporated by reference into the present application. The sidelink includes sidelink discovery, sidelink communication, and V2X sidelink communication between network units UE1, UE2. The sidelink uses uplink resources and a physical channel structure similarly as for the uplink. Thus, the sidelink differs from the uplink with regard to the physical channel.

The sidelink is limited to individual cluster transmissions for the physical sidelink channels. In addition, the sidelink uses a one-symbol gap at the end of each sidelink subframe. For the V2X sidelink communication, physical sidelink control channel (PSCCH) and physical sidelink shared channel (PSSCH) are transmitted in the same subframe. Sidelink channels SC1, SC2 are the PSSCH, for example.

The physical layer processing of transport channels in the sidelink differs from the uplink transmission in the following steps: scrambling, where, for physical sidelink discovery channel (PSDCH) and PSCCH, the scrambling is not specific for the network unit; and modulation, where 64 quadrature amplitude modulation (QAM) and 256 QAM are not supported for the sidelink. The PSCCH indicates sidelink resources and other transmission parameters that are used by particular network unit UE1, UE2 for the PSSCH.

For the PSDCH, PSCCH, and PSSCH demodulation, reference signals similar to the uplink demodulation reference signals are transmitted in the fourth symbol of the slot in normal cyclic prefix CP, and in the third symbol of the slot in expanded CP. The sidelink demodulation reference signal sequence length corresponds to the size (number of subcarriers) of the associated resource. For the V2X sidelink communication, reference signals are transmitted in the third and sixth symbols of the first slot and in the second and fifth symbols of the second slot in the CP. For PSDCH and PSCCH, reference signals based on a fixed base sequence, cyclic shift, and orthogonal cover code are generated. For the V2X sidelink communication, the cyclic shift for PSCCH is randomly selected for each transmission.

For measurements of particular sidelink channel SC1, SC2, the following options are available on the side of network units UE1, UE2: reception power output of the sidelink reference signal (S-RSRP); reception power output of the sidelink discovery reference signal (SD-RSRP); reception power output of the PSSCH reference signal (PSSCH-RSRP); and signal strength indicator for sidelink reference signals (S-RSSI).

Ad hoc channel ADCH and ad hoc wireless communications network VANET are defined by the IEEE 802.11p-2010 standard "IEEE standard for information technology—Local and metropolitan area networks—Specific requirements—Part 11: Wireless LAN medium access control (MAC) and physical layer (PHY) specifications, Amendment 6: Wireless access in vehicular environments," which is incorporated by reference into the present application. IEEE 802.11p is a standard for enhancement of the WLAN IEEE 802.11 standard. The objective of IEEE 802.11p is to establish the WLAN technology in passenger vehicles and provide a reliable interface for applications for intelligent transport systems (ITSs). IEEE 802.11p is also the basis for dedicated short-range communication (DSRC) in the frequency band of 5.85 to 5.925 GHz.

To avoid confusion with the European DSRC version, the term ITS-G5 is preferably used instead of DSRC, in particular in Europe.

The document "ETSI EN 302 663 V1.2.0 (2012-11)," which is incorporated by reference into the present application, describes both lowermost layers of the ITS-G5 technology (ITS G5: intelligent transport systems operating in the 5 GHz frequency band), the physical layer, and the data link layer. Transceivers TA1 and TA3 implement these two lowermost layers and corresponding functions, for example, according to "ETSI TS 102 687 V1.1.1 (2011-07)" in order to use ad hoc channel ADCH. For use of ad hoc channel ADCH, in Europe the following unlicensed frequency ranges are available which are part of unlicensed frequency range NLFB: 1) ITS-G5A for safety-relevant applications in the frequency range of 5.875 GHz to 5.905 GHz; 2) ITS-G5B for non-safety-relevant applications in the frequency range of 5.855 GHz to 5.875 GHz; and 3) ITS-G5D for the operation of ITS applications in the frequency range of 5.905 GHz to 5.925 GHz. ITS-G5 allows communication between the two network units UE1 and UE2 outside the context of a base station. ITS-G5 allows the immediate exchange of data frames, and avoids management overhead used in setting up a network.

The document "ETSI TS 102 687 V1.1.1 (2011-07)," which is incorporated by reference into the present application, describes a decentralized congestion control mechanism for ITS-G5. Ad hoc channel ADCH is used, among other things, for the exchange of data concerning traffic safety and traffic efficiency. Transceivers TA1 and TA3 implement, for example, the functions described in the document "ETSI TS 102 687 V1.1.1 (2011-07)." The applications and services in ITS-G5 are based on the cooperative behavior of the roadside network units that form the vehicular ad hoc network (VANET). Ad hoc network VANET allows time-critical road traffic applications in which rapid information exchange is necessary to warn and assist the driver and/or the vehicle in a timely manner. To ensure proper functioning of ad hoc network VANET, the decentralized congestion control (DCC) mechanism for ad hoc channel ADCH is used by ITS-G5. DCC includes functions that are situated on multiple layers of the ITS architecture. The DCC mechanisms are based on knowledge concerning the channel. The channel status information is obtained by channel sounding. Channel status information can be obtained via the transmit power control (TPC), transmit rate control (TRC), and transmit data rate control (TDC) methods. The methods ascertain the channel status information as a function of reception signal level thresholds or preamble information of detected packets.

In the following description, reference is made to first sidelink channel SC1 in unlicensed frequency range NLFB.

Figure 2:
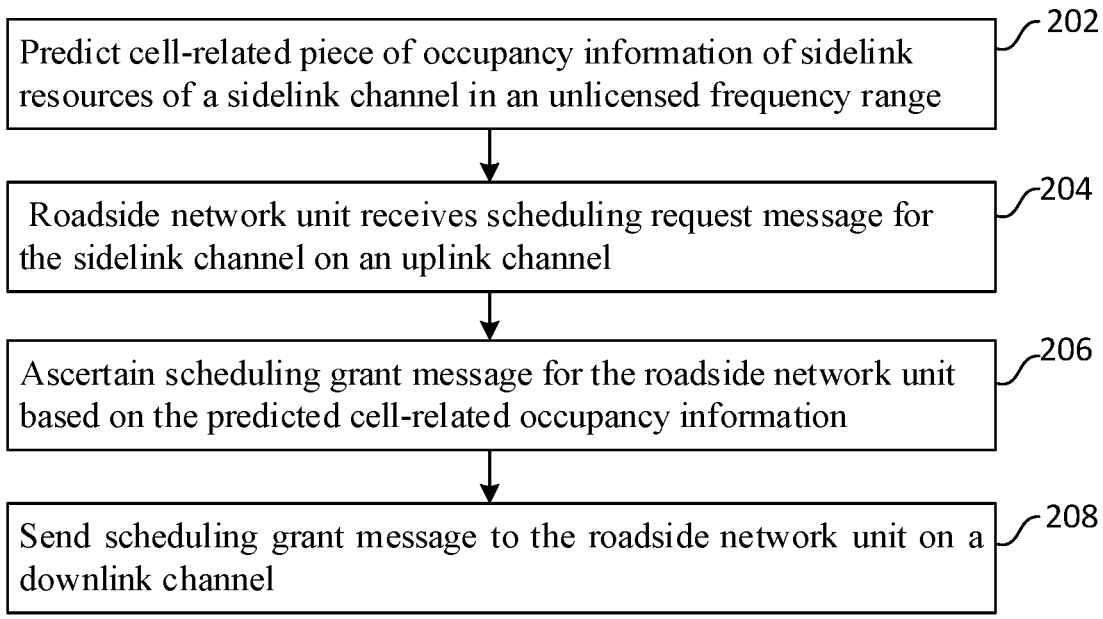
FIGS. 2 and 3 each is a flowchart of a method according to an example embodiment of the present invention.

FIG. 2 shows a schematic flowchart for operating network infrastructure-side network unit BS from FIG. 1. A cell-related piece of occupancy information of sidelink resources of a sidelink channel in an unlicensed frequency range is predicted in a step 202, the occupancy information including a likely occupancy of the sidelink resources by non-sidelink communication in the unlicensed frequency range. For example, for ascertaining the cell-related occupancy information, a number of network units that do not belong to the cell-based network and that transmit on the same unlicensed frequency range as the sidelink channel are ascertained, and based on this number a portion of the frequency spectrum utilized by the above-mentioned network units is ascertained. This portion then corresponds to the cell-related occupancy information. A scheduling request message for the sidelink channel is received by a roadside network unit on an uplink channel in a step 204. A scheduling grant message for the roadside network unit is ascertained based on the predicted cell-related occupancy information in a step 206, the scheduling grant message including an assignment of at least one sidelink resource of the sidelink channel to the roadside network unit. The scheduling grant message on a downlink channel is sent to the roadside network unit in a step 208.

Figure 3:
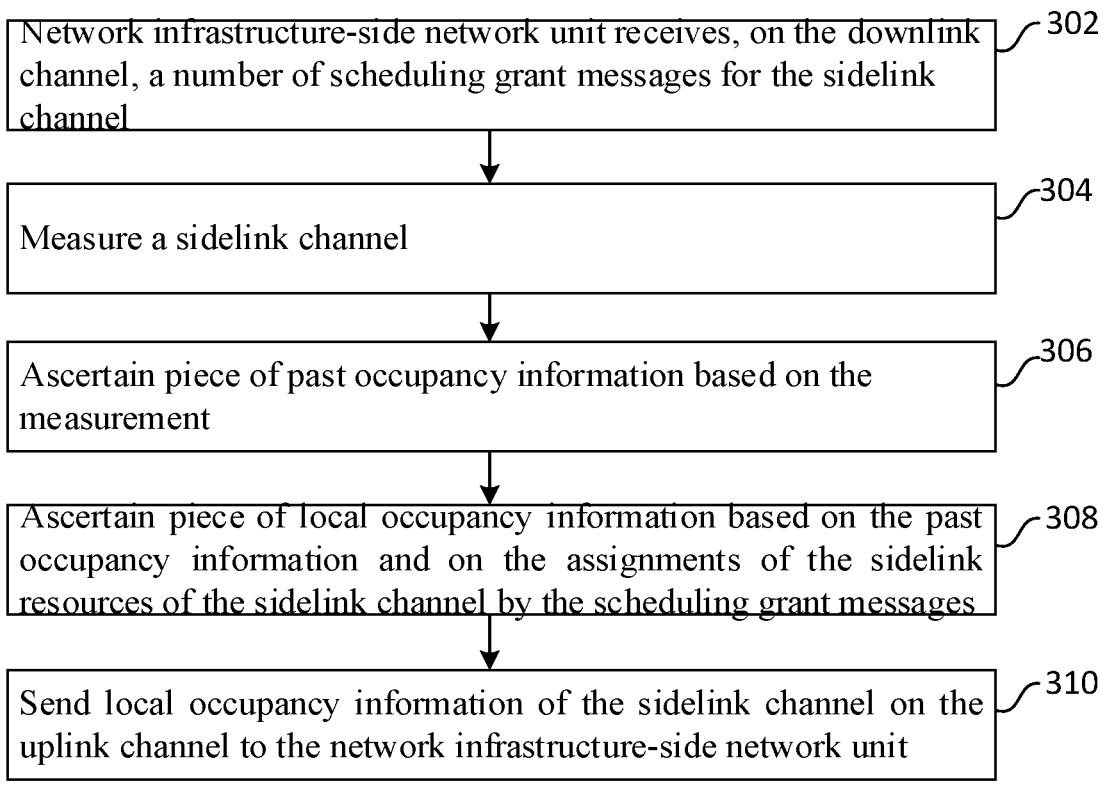

FIG. 3 shows a schematic flowchart for operating roadside network unit UE1 from FIG. 1. A number of scheduling grant messages for the sidelink channel are received by the network infrastructure-side network unit on the downlink channel in a step 302, each of the scheduling grant messages including an assignment of at least one sidelink resource of the sidelink channel to one of the roadside network units situated in a cell. A measurement of a sidelink channel is carried out in a step 304. A measurement of the sidelink channel is understood to mean that network unit BS, UE1, or UE2 records the reception power output on the sidelink channel as a function of time. A piece of occupancy information from the past is ascertained in a step 306 based on the measurement of the sidelink channel. A piece of local occupancy information is ascertained in a step 308 based on the occupancy information from the past and based on the assignments of the sidelink resources of the sidelink channel by the scheduling grant messages. The local occupancy information of the sidelink channel on the uplink channel is sent to the network infrastructure-side network unit in a step 310.

Figure 4:
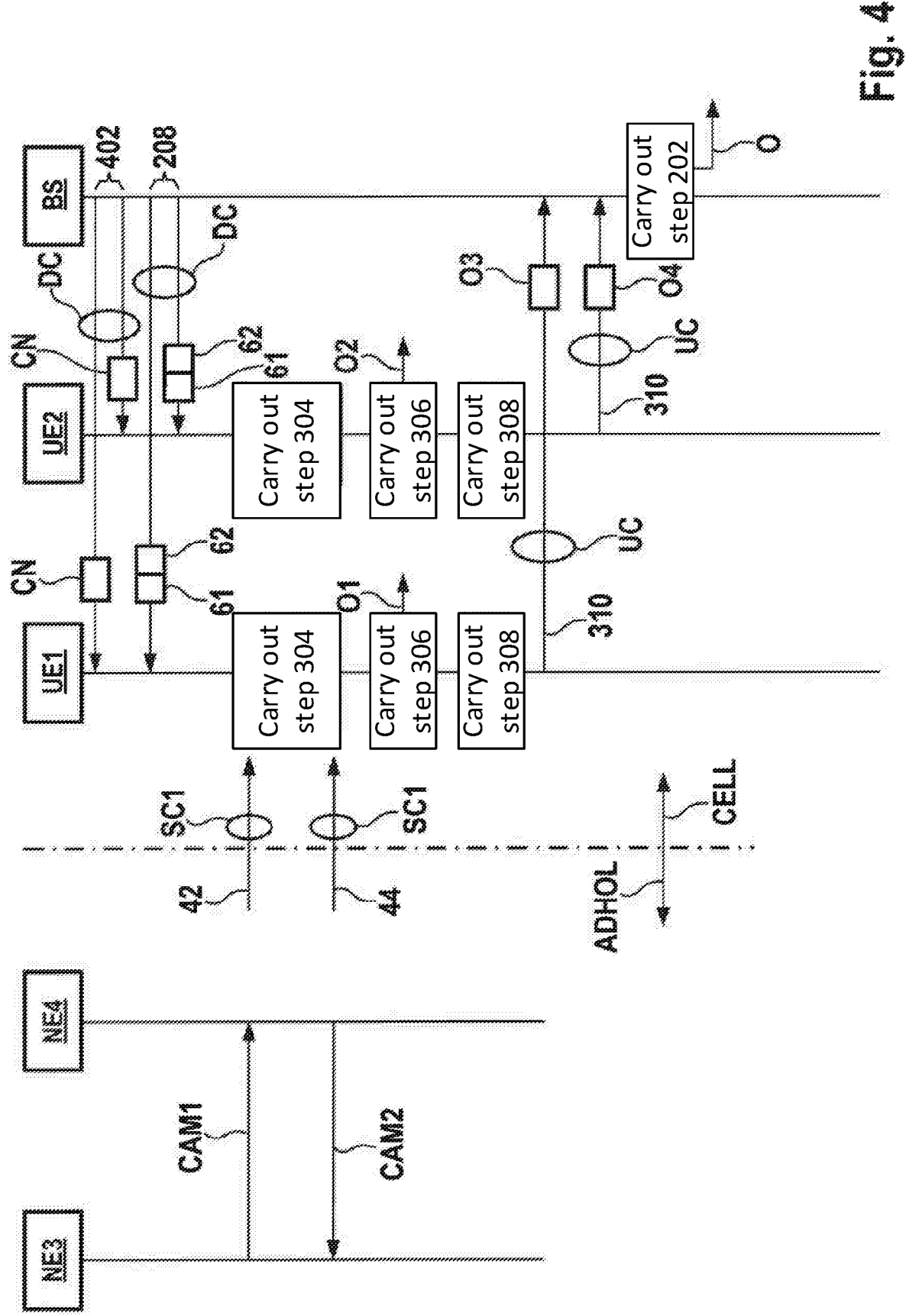
FIGS. 4, 5, 7, and 9 each shows a schematic sequence diagram according to an example embodiment of the present invention.

FIG. 4 shows a schematic sequence diagram. A control message CN is transmitted to the two network units UE1 and UE2 via downlink channel DC in a step 402. Control message CN includes, for example, a report rate for ascertaining and sending pieces of occupancy information O3 and O4 and/or a time period for carrying out the measurement in step 304. Network unit BS sends a number of scheduling grant messages G1, G2 to network units UE1 and UE2 via downlink channel DC in step 208. Scheduling grant messages G1, G2 can, but do not have to, be associated with network units UE1 and UE2. Network units UE1, UE2 each carries out a measurement of sidelink channel SC1 in step 304, which includes, for example, chronologically successive measurements of a reception power output at a predetermined frequency in the unlicensed frequency range. As indicated by arrows 42 and 44, a communication between network units NE3 and NE4 that includes messages CAM1, CAM2 can interfere with sidelink channel SC1, which is reflected in the measurements in step 304.

A particular piece of occupancy information O1, O2 is ascertained in step 306, based on the measurement carried out in the past. Pieces of occupancy information O1, O2 include the measured reception power outputs above a reception power output threshold value, and thus also communications in first and second wireless communications networks CELL, VANET. Pieces of occupancy information O1 and O2 are different when the network units UE1 and UE2 are situated at different locations in the cell, and thus have different distances from network units NE3 and NE4.

In step 308, only network units UE1 and UE2 ascertain local pieces of occupancy information O3 and O4, respectively, based on particular pieces of occupancy information O1 and O2 and based on the assignments in scheduling grant messages G1, G2. Local pieces of occupancy information O3 and O4 thus include occupancy information that originates solely from non-sidelink communication, for example via messages CAM1, CAM2 that are exchanged between network units NE3 and NE4.

Network units UE1 and UE2 send local pieces of occupancy information O3 and O4 to network unit BS via uplink channel UC in step 310. Network unit BS predicts cell-related occupancy information O in step 202.

Cell-related occupancy information O and the other pieces of occupancy information in the present application are a two-dimensional occupancy matrix, for example. This two-dimensional occupancy matrix includes bit values that indicate occupancy or non-occupancy of a time-frequency resource on sidelink channel SC1.

In second wireless network VANET, for example messages CAM1, CAM2 are sent which are not readable by network units UE1, UE2, and BS in first network CELL, but which can cause channel interference on sidelink channel SC1. Messages CAM1, CAM2 are cooperative awareness messages, for example, that are sent between network units NE3, NE4 at regular time intervals of 100 ms, for example.

Figure 5:
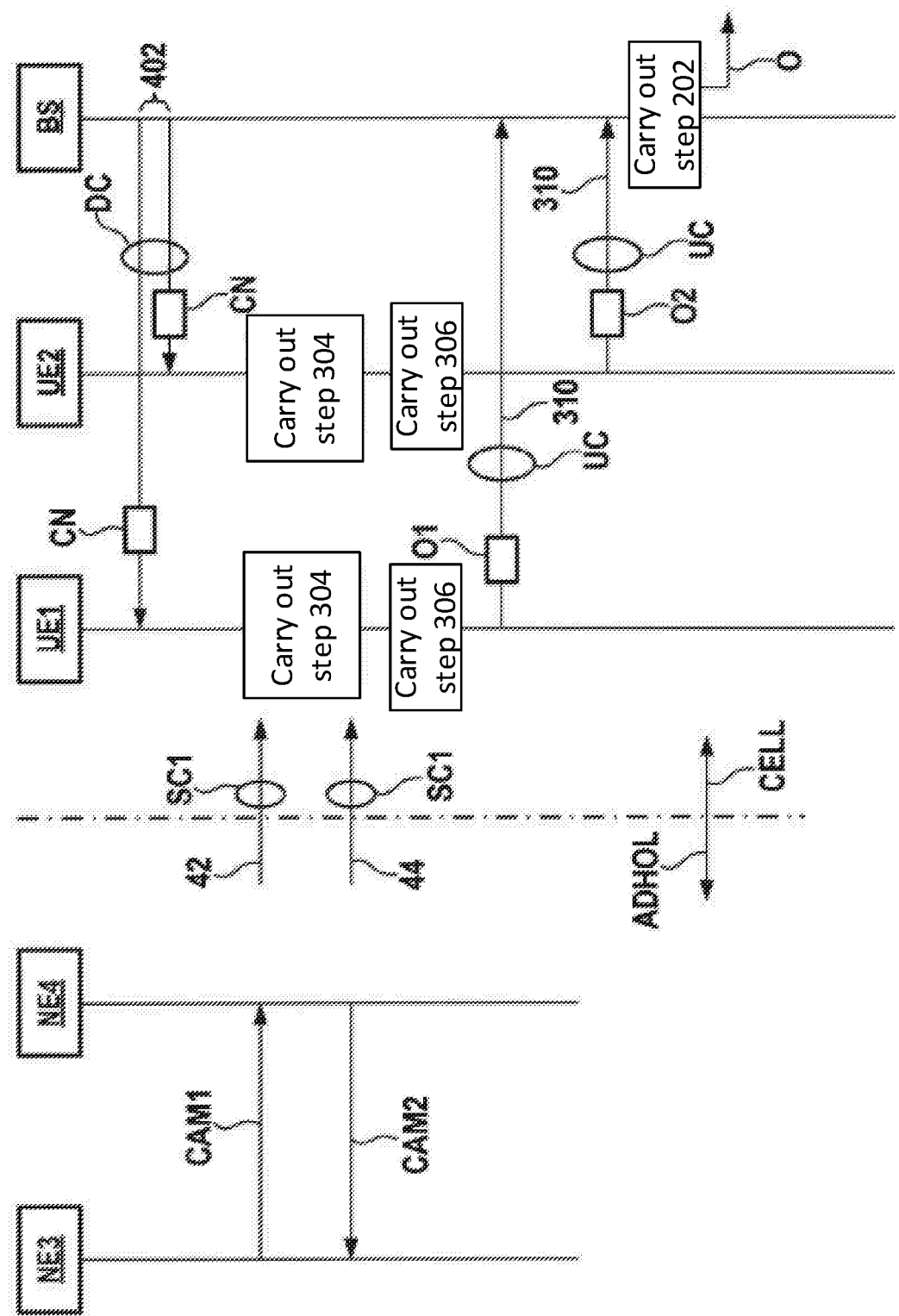

FIG. 5 shows a schematic sequence diagram. In contrast to FIG. 4, steps 208, 308 are not shown in the figure. Network units UE1 and UE2 carry out steps 304 and 306 for ascertaining and sending particular local pieces of occupancy information O1 and O2. Cell-related occupancy information O is ascertained in step 202 based on local occupancy information O1 and O2 and based on the assignments of sidelink resources of sidelink channel SC1, which are known to network unit BS. Pieces of occupancy information O1 and O2 contain information concerning sidelink communication as well as non-sidelink communication in the same unlicensed frequency band.

Figure 6:
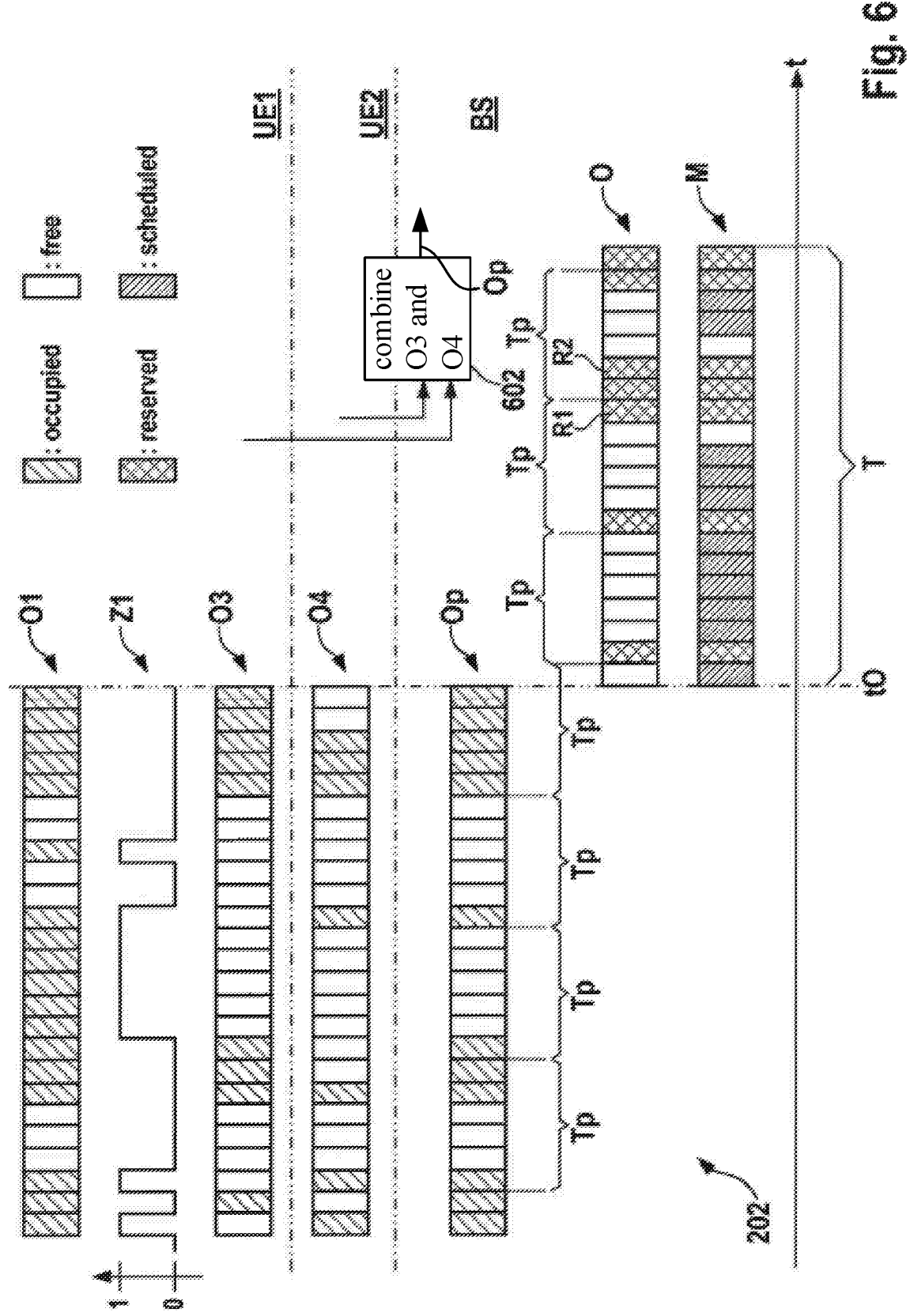
FIGS. 6 and 8 each shows a schematic illustration for ascertaining a piece of cell-related occupancy information according to an example embodiment of the present invention.

FIG. 6 shows a schematic illustration for ascertaining cell-related occupancy information O, with reference to FIG. 4. Occupation information O1 has been ascertained from the measurement of the sidelink channel. Allocations Z1 can be ascertained from the scheduling grant messages, where 0 stands for unoccupied and 1 stands for occupied. Allocations Z1 thus include only the sidelink resources that are reserved or scheduled by network infrastructure-side network unit BS. Via an exclusive OR operation according to O3=O1 XOR Z1, local occupancy information O3, which contains only the resources occupied by network units of the second wireless network, is ascertained. Second roadside network unit UE2 analogously ascertains its own local occupancy information O4 for ascertaining occupancy information O3.

Received local pieces of occupancy information O3 and O4 are combined in a step 602 by network infrastructure-side network unit BS to form cell-related occupancy information Op from the past. Cell-related occupancy information Op is ascertained according to an OR function Op=O3 OR O4, for example.

For example, a regularly recurring pattern of sidelink resources occupied by non-sidelink communication can be determined by frequency analysis. Thus, for example, use can advantageously be made of the property of ITS-G5 traffic that provides periodic sending of messages. In the example shown, it has been ascertained that the sidelink channel is occupied by non-sidelink communication at regular time intervals Tp. As an alternative or in addition to the frequency analysis, other prediction algorithms can be used for the pattern recognition.

If the above-mentioned recurring pattern is now continued into the future, in the cell-related occupancy information O, sidelink resources for scheduling are excluded by network infrastructure-side network unit BS and reserved for the non-sidelink traffic. In addition to these reserved resources, further resources R1 and R2 are reserved for the non-sidelink traffic, which are then available for non-periodically recurring data traffic. The free sidelink resources in cell-related occupancy information O can be scheduled by network infrastructure-side network unit BS according to shown pattern M. The scheduled sidelink resources are communicated to roadside network units UE1, UE2.

Cell-related occupancy information O is valid for a time period T. Time period T is ascertained as a function of an average speed at which network units UE1 and UE2 move. This average speed can be selected, for example, as a function of the installation site of the antenna of network infrastructure-side network unit BS. Thus, time period T can be selected to be longer when the antenna is situated in an urban area in which network units UE1, UE2 move at a slower speed than in the area of an expressway. In addition, this average speed can be varied according to the time of day. Another example includes the estimation of the speed of individual roadside network unit UE1, UE2 by infrastructure-side network unit BS. In addition, roadside network units UE1, UE2 can transmit their speed directly to infrastructure-side network unit BS. Additionally or alternatively, time period T is adapted based on measurements of at least one of sidelink channels SC1, SC2, and thus, based on channel status information.

Figure 7:
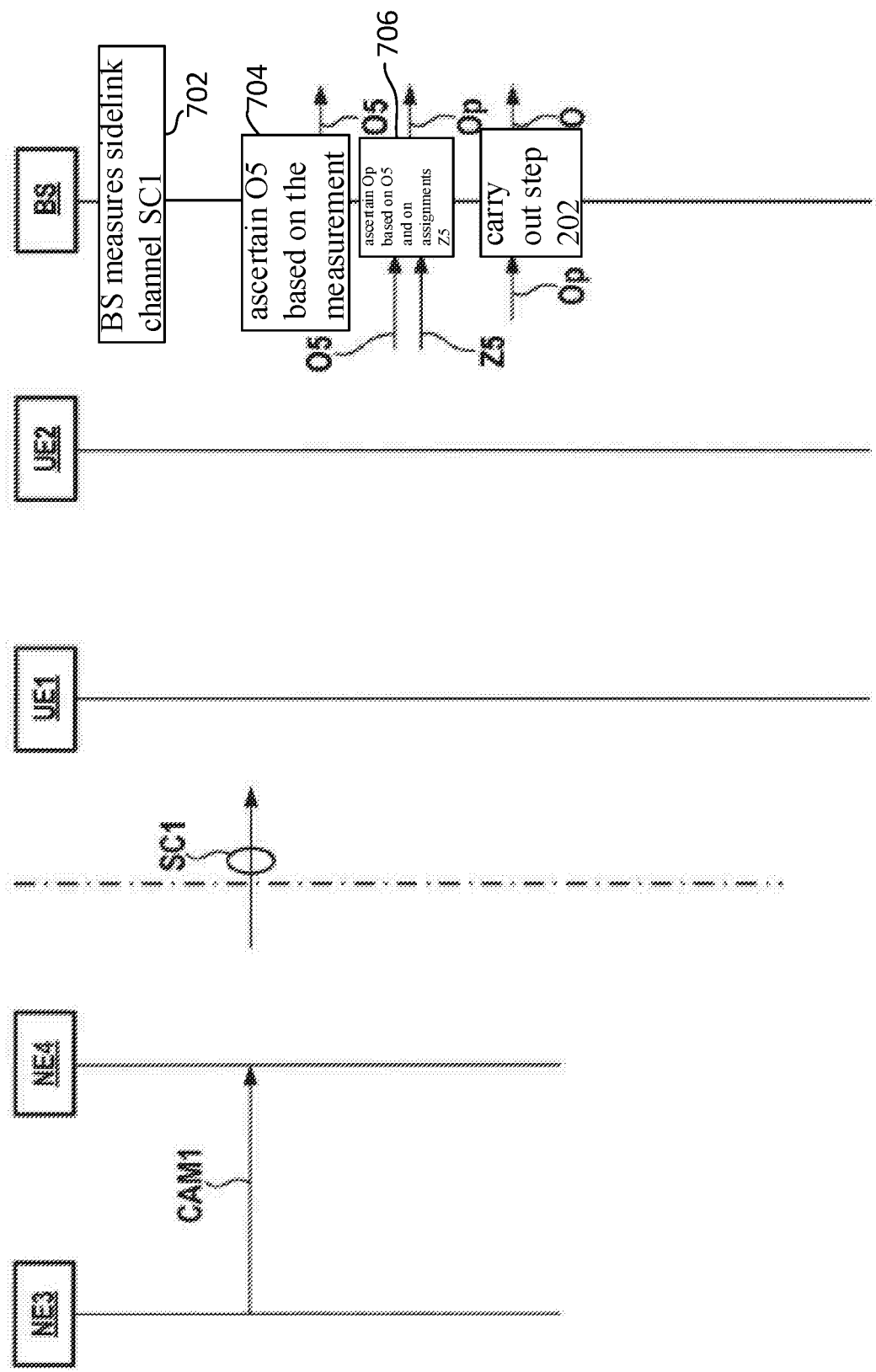

FIG. 7 shows a schematic sequence diagram. A measurement of sidelink channel SC1 by network infrastructure-side network unit BS is carried out in a step 702. A first piece of occupancy information O5 from the past is ascertained in a step 704, based on the measurement of sidelink channel SC1. Second piece of occupancy information Op from the past is ascertained in a step 706, based on first piece of occupancy information O5 and based on assignments Z5 of sidelink resources of sidelink channel SC1 to roadside network units UE1, UE2 ascertained by network unit BS. Cell-related occupancy information O for sidelink channel SC1 is predicted based on second piece of occupancy information Op in step 202. By use of this method, non-sidelink network traffic, for example in the form of message CAM1 that occurs in the measurable vicinity of network infrastructure-side network unit BS, is taken into account during the scheduling in a subsequent step. In particular for small cells, for example femtocells, picocells, or microcells, this method offers an advantage, since all roadside network units UE1, UE2, NE3, and NE4 are potentially situated within the cell coverage.

Figure 8:
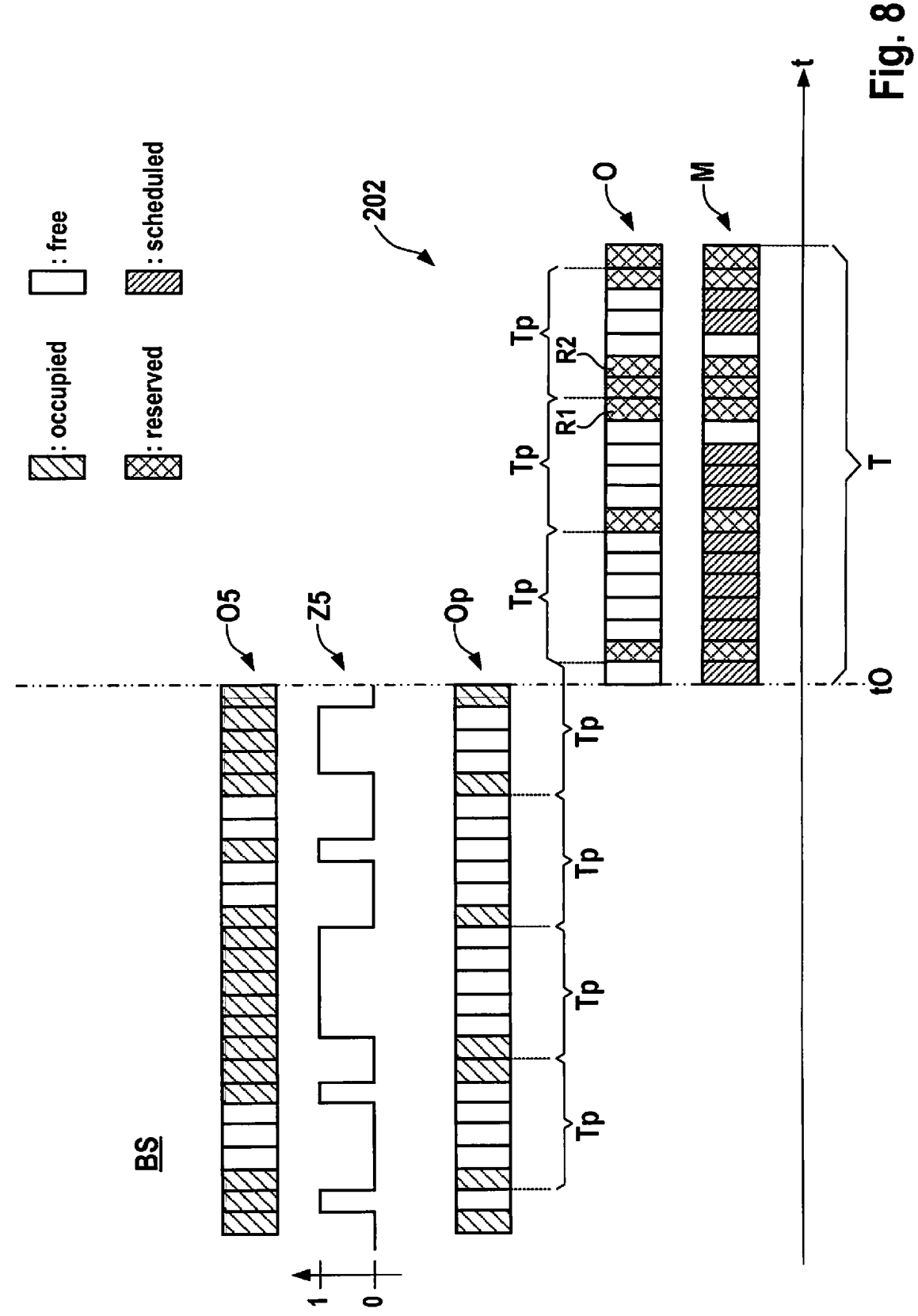

FIG. 8 shows a schematic illustration for ascertaining cell-related occupancy information O, as well as step 202 as a supplement to FIG. 7. The channel measurement results in a piece of occupancy information O5, which is compared to assignments Z5 that are known from the assignments of the schedulings of sidelink resources network unit BS. Occupation information Op from the past is ascertained according to an operation Op=O5 XOR Z5. For the further steps, reference is made to the discussion for FIG. 6.

Figure 9:
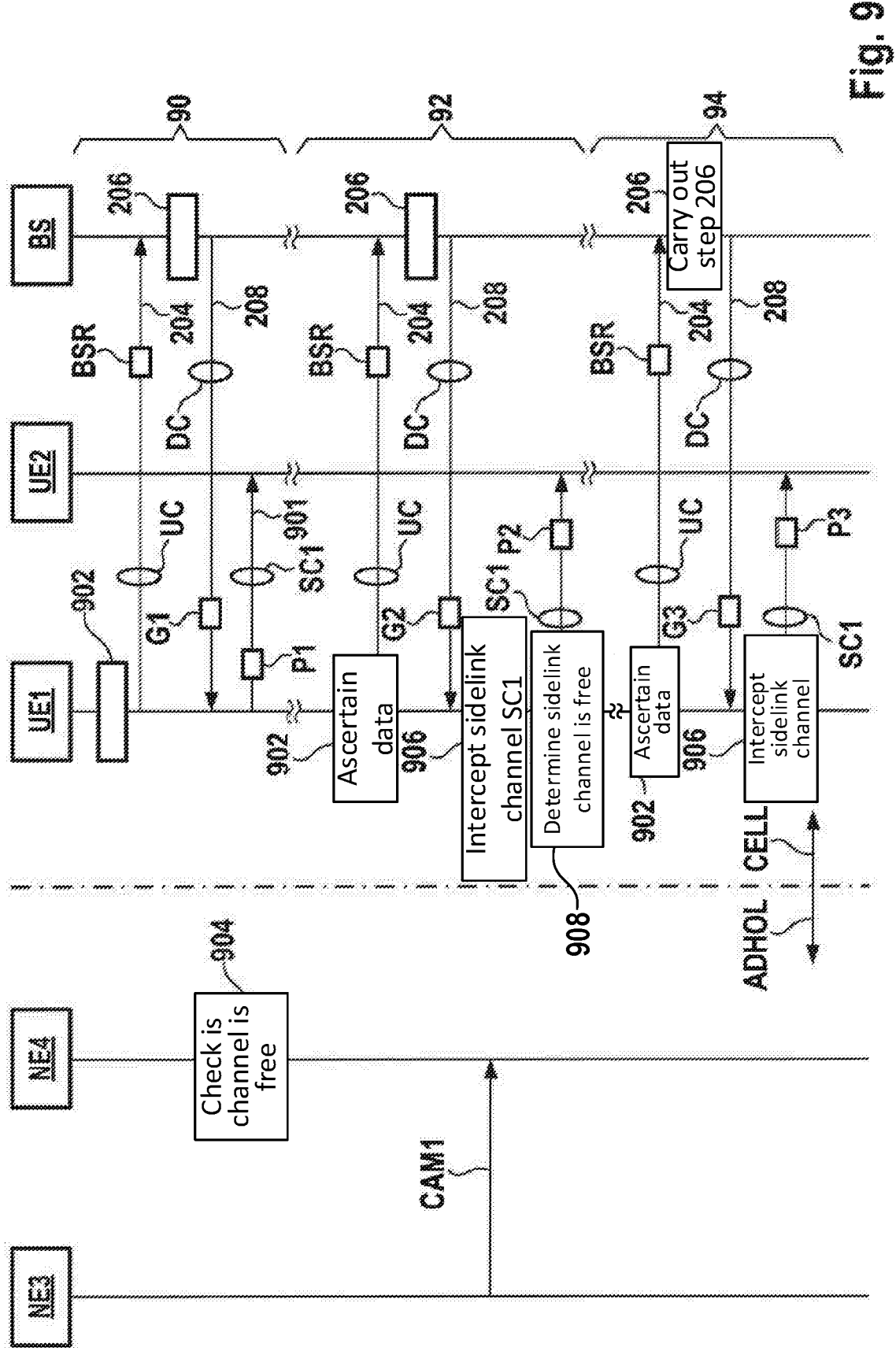

FIG. 9 shows a schematic sequence diagram. Three sequences 90, 92, and 94 are shown. Sequence 90 is explained first. First roadside network unit UE1 ascertains data P1 in a step 902 for sending to second roadside network unit UE2. For this purpose, network unit UE1 sends a scheduling request message BSR, for example a buffer status report, to network unit BS, which receives it in step 204. Scheduling request message BSR includes, for example, a quality of service requirement, the above-mentioned buffer status report, and/or a planned message rate of the roadside network unit. Network unit BS ascertains a first scheduling grant message G1 in step 206, and sends it to first network unit UE1 on downlink channel DC in step 208. Network unit UE1 does not check whether sidelink channel SC1 is free, but instead transmits data P1 to network unit UE2 via sidelink channel SC1 in the sidelink resources, assigned using scheduling grant message G1, in a step 901. If network unit NE3 intends to send data at the same time that data P1 are sent, network unit NE3 checks in a step 904 whether the associated channel is free. If this is presently not the case, network unit NE3 sends no data, but instead waits for a so-called backoff period before a new transmission attempt.

According to sequence 92, data P2 for sending to network unit UE2 are ascertained in step 902. With regard to steps 204, 206, and 208, reference is made to sequence 90. After receipt of a scheduling grant message G2 ascertained in step 206, network unit UE1 intercepts sidelink channel SC1 in a step 906 and determines that sidelink channel SC1 is potentially occupied by a communication in second wireless network VANET, in the present case, sending of message CAM1. Network unit UE1 determines that sidelink channel SC1 is free in a step 908, which means that the sending of message CAM1 is complete, and immediately transmits data P2 to network unit UE2, utilizing sidelink resources of sidelink channel SC1 assigned by scheduling grant message G2. A prerequisite is that scheduling grant message G2 makes sidelink resources on sidelink channel SC1 available to network unit UE1 that are sufficient on the one hand to bridge the waiting period until data P2 are sent, and on the other hand to ensure the sending of data P2. This means that more sidelink resources must be assigned by network unit BS than are necessary for sending data P2, starting from network unit UE1.

According to sequence 94, data P3 are ascertained in step 902. With regard to steps 204, 206, and 208, reference is made to the preceding description. A scheduling grant message G3 ascertained in step 206 and received by first network unit UE1 includes sidelink resources allocated to network unit UE1. First network unit UE1 checks whether sidelink channel SC1 is free in step 910. If this is the case, network unit UE1 immediately transmits data P3 to network unit UE2 via sidelink channel SC1, using the assigned sidelink resources. If more sidelink resources have been assigned than are necessary for transmitting data P3, these additional sidelink resources are available for a data transmission in second wireless network VANET. Sequences 92 and 94 correspond to a "listen before talk" method.

An aspect of the present invention is directed to a method for operating a network infrastructure-side network unit of a cell-based wireless communications network, the method including: predicting a piece of cell-related occupancy information of sidelink resources of a sidelink channel in an unlicensed frequency range, the occupancy information including a likely occupancy of the sidelink resources by non-sidelink communication in the unlicensed frequency range; receiving a scheduling request message for the sidelink channel from a roadside network unit on an uplink channel; ascertaining a scheduling grant message for the roadside network unit based on the predicted cell-related occupancy information, the scheduling grant message including an assignment of at least one sidelink resource of the sidelink channel to the roadside network unit; and sending the scheduling grant message to the roadside network unit on a downlink channel.

In an example, the method further includes: receiving a number of pieces of local occupancy information of the sidelink channel from particular roadside network units on the uplink channel;

and predicting the cell-related occupancy information based on the received local occupancy information. In an example, the method further includes: weighting the particular local occupancy information as a function of a distance indication, in particular as a function of a signal strength received by the particular roadside network unit.

In an example, the method further includes: carrying out a measurement of the sidelink channel; ascertaining a first piece of occupancy information from the past based on the measurement of the sidelink channel; ascertaining a second piece of occupancy information from the past based on the first piece of occupancy information and based on ascertained assignments of sidelink resources of the sidelink channel to roadside network units; and predicting the cell-related occupancy information of the sidelink channel based on the second piece of occupancy information.

In an example, the method further includes: ascertaining a validity period for the cell-related occupancy information, in particular as a function of a previously determined or ascertained average movement speed of the roadside network units situated in the cell; and predicting a further piece of cell-related occupancy information before the validity period elapses.

An aspect of the present invention is directed to a network infrastructure-side network unit of a cell-based wireless communications network, including: a processor that is configured to predict a piece of cell-related occupancy information of sidelink resources of a sidelink channel in an unlicensed frequency range, the occupancy information including a likely occupancy of the sidelink resources by non-sidelink communication in the unlicensed frequency range; and an antenna and a transceiver that are configured to receive a scheduling request message for the sidelink channel from a roadside network unit on an uplink channel; where the processor is configured to ascertain a scheduling grant message for the roadside network unit based on the predicted cell-related occupancy information, the scheduling grant message including an assignment of at least one sidelink resource of the sidelink channel to the roadside network unit, and where the antenna and the transceiver are configured to send the scheduling grant message to the roadside network unit on a downlink channel.

An aspect of the present invention is directed to a method for operating a roadside network unit of a cell-based wireless communications network, the method including: carrying out a measurement of a sidelink channel; ascertaining a piece of local occupancy information from the past based on the measurement of the sidelink channel; and sending the local occupancy information of the sidelink channel to the network infrastructure-side network unit on the uplink channel.

In an example, the method further includes: receiving a number of scheduling grant messages for the sidelink channel from the network infrastructure-side network unit on a downlink channel, the scheduling grant messages each including an assignment of at least one sidelink resource of the sidelink channel to one of the roadside network units situated in a cell; and ascertaining a further piece of local occupancy information based on the local occupancy information from the past and based on the assignments of the sidelink resources of the sidelink channel by the scheduling grant messages.

An aspect of the present invention is directed to a roadside network unit of a cell-based wireless communications network, including: an antenna and a transceiver that are configured to carry out a measurement of a sidelink channel; and a processor that is configured to ascertain a piece of local occupancy information from the past based on the measurement of the sidelink channel; where the antenna and the transceiver are configured to send the local occupancy information of the sidelink channel to the network infrastructure-side network unit on the uplink channel.

In an example, the roadside network unit is configured to perform a method that includes: carrying out a measurement of a sidelink channel; ascertaining a piece of local occupancy information from the past based on the measurement of the sidelink channel; and sending the local occupancy information of the sidelink channel to the network infrastructure-side network unit on the uplink channel. In an example, the method further includes: receiving a number of scheduling grant messages for the sidelink channel from the network infrastructure-side network unit on a downlink channel, the scheduling grant messages each including an assignment of at least one sidelink resource of the sidelink channel to one of the roadside network units situated in a cell; and ascertaining a further piece of local occupancy information based on the local occupancy information from the past and based on the assignments of the sidelink resources of the sidelink channel by the scheduling grant messages.

An aspect of the present invention is directed to a motor vehicle that includes the above-noted roadside network unit.

What is claimed is:

1. A method for operating a base station of a cell-based wireless communications network, the method comprising:
predicting a piece of cell-related occupancy information of sidelink resources of a sidelink channel in an unlicensed frequency range, the occupancy information including a likely occupancy of the sidelink resources by non-sidelink communication in the unlicensed frequency range;
receiving a scheduling request message for the sidelink channel from a user equipment (UE) on an uplink channel;
ascertaining a scheduling grant message for the UE based on the predicted cell-related occupancy information, the scheduling grant message including an assignment of at least one sidelink resource of the sidelink channel to the UE; and
sending the scheduling grant message to the UE on a downlink channel;
wherein the method further comprises:
receiving a number of pieces of local occupancy information of the sidelink channel from the UE or one or more other UEs on the uplink channel;
predicting the cell-related occupancy information based on the received local occupancy information; and
weighting respective pieces of the local occupancy information as a function of a distance indication.

2. A method for operating a base station of a cell-based wireless communications network, the method comprising:

predicting a piece of cell-related occupancy information of sidelink resources of a sidelink channel in an unlicensed frequency range, the occupancy information including a likely occupancy of the sidelink resources by non-sidelink communication in the unlicensed frequency range;
receiving a scheduling request message for the sidelink channel from a user equipment (UE) on an uplink channel;
ascertaining a scheduling grant message for the UE based on the predicted cell-related occupancy information, the scheduling grant message including an assignment of at least one sidelink resource of the sidelink channel to the UE; and
sending the scheduling grant message to the UE on a downlink channel;
wherein the method further comprises:
receiving a number of pieces of local occupancy information of the sidelink channel from the UE or one or more other UEs on the uplink channel;
predicting the cell-related occupancy information based on the received local occupancy information; and
weighting respective pieces of the local occupancy information as a function of a signal strength received by the particular UE, the signal strength indicating a distance.

3. The method of claim 1, further comprising:
carrying out a measurement of the sidelink channel;
ascertaining a first piece of past occupancy information based on the measurement of the sidelink channel; and
ascertaining a second piece of past occupancy information based on:
(a) the first piece of past occupancy information; and
(b) the assignment of the at least one sidelink resource of the sidelink channel to the UE or one or more respective ascertained assignments of sidelink resources of the sidelink channel to one or more other UEs; and
wherein the predicting is based on the second piece of occupancy information.

4. A method for operating a base station of a cell-based wireless communications network, the method comprising:
predicting a piece of cell-related occupancy information of sidelink resources of a sidelink channel in an unlicensed frequency range, the occupancy information including a likely occupancy of the sidelink resources by non-sidelink communication in the unlicensed frequency range;
receiving a scheduling request message for the sidelink channel from a user equipment (UE) on an uplink channel;
ascertaining a scheduling grant message for the UE based on the predicted cell-related occupancy information, the scheduling grant message including an assignment of at least one sidelink resource of the sidelink channel to the UE; and
sending the scheduling grant message to the UE on a downlink channel;
wherein the method further comprises:
ascertaining a validity period for the cell-related occupancy information; and
predicting a further piece of cell-related occupancy information before the validity period elapses;
wherein the ascertainment of the validity period is performed based on a previously ascertained average movement speed of a plurality of UEs, including the UE from which the scheduling request is received, situated in the cell.

5. A base station of a cell-based wireless communications network, the base station comprising:
a processor; an antenna; and a transceiver; wherein the processor is configured to:
receive, via the antenna and transceiver, a scheduling request message for the sidelink channel from a user equipment (UE) on an uplink channel;
predict a piece of cell-related occupancy information of sidelink resources of a sidelink channel in an unlicensed frequency range, the occupancy information including a likely occupancy of the sidelink resources by non-sidelink communication in the unlicensed frequency range;
ascertain a scheduling grant message for the UE based on the predicted cell-related occupancy information, the scheduling grant message including an assignment of at least one sidelink resource of the sidelink channel to the UE; and
send the scheduling grant message, via the antenna and transceiver, to the UE on a downlink channel;
wherein the processor is further configured to:
receive a number of pieces of local occupancy information of the sidelink channel from the UE or one or more other UEs on the uplink channel;
predict the cell-related occupancy information based on the received local occupancy information; and
weight respective pieces of the local occupancy information as a function of a distance indication.

6. A base station of a cell-based wireless communications network, the base station comprising:
a processor; an antenna; and a transceiver;
wherein the processor is configured to:
receive, via the antenna and transceiver, a scheduling request message for the sidelink channel from a user equipment (UE) on an uplink channel;
predict a piece of cell-related occupancy information of sidelink resources of a sidelink channel in an unlicensed frequency range, the occupancy information including a likely occupancy of the sidelink resources by non-sidelink communication in the unlicensed frequency range;
ascertain a scheduling grant message for the UE based on the predicted cell-related occupancy information, the scheduling grant message including an assignment of at least one sidelink resource of the sidelink channel to the UE; and
send the scheduling grant message, via the antenna and transceiver, to the UE on a downlink channel;
wherein the processor is further configured to:
receive a number of pieces of local occupancy information of the sidelink channel from the UE or one or more other UEs on the uplink channel;
predict the cell-related occupancy information based on the received local occupancy information; and
weight respective pieces of the local occupancy information as a function of a signal strength received by the particular UE, the signal strength indicating a distance.

7. A base station of a cell-based wireless communications network, the base station comprising:
a processor; an antenna; and a transceiver;
wherein the processor is configured to:
receive, via the antenna and transceiver, a scheduling request message for the sidelink channel from a user equipment (UE) on an uplink channel;
predict a piece of cell-related occupancy information of sidelink resources of a sidelink channel in an unlicensed frequency range, the occupancy information including a likely occupancy of the sidelink resources by non-sidelink communication in the unlicensed frequency range;
ascertain a scheduling grant message for the UE based on the predicted cell-related occupancy information, the scheduling grant message including an assignment of at least one sidelink resource of the sidelink channel to the UE; and
send the scheduling grant message, via the antenna and transceiver, to the UE on a downlink channel;
wherein the processor is further configured to:
ascertain a validity period for the cell-related occupancy information; and
predict a further piece of cell-related occupancy information before the validity period elapses;
wherein the ascertainment of the validity period is performed based on a previously ascertained average movement speed of a plurality of UEs, including the UE from which the scheduling request is received, situated in the cell.

* * * * *